United States Patent
Mitra et al.

(10) Patent No.: US 12,257,558 B2
(45) Date of Patent: Mar. 25, 2025

(54) NANOCARBON ENHANCED MEMBRANE FOR PURIFICATION AND DEWATERING OF SOLVENTS AND FUELS

(71) Applicant: NANOSEPEX, INC., Newark, NJ (US)

(72) Inventors: Somenath Mitra, Bridgewater, NJ (US); Sagar Roy, Newark, NJ (US); Sumona Paul, Harrison, NJ (US)

(73) Assignee: NANOSEPEX INC., Newark, NJ (US)

( * ) Notice: Subject to any disclaimer, the term of this patent is extended or adjusted under 35 U.S.C. 154(b) by 0 days.

(21) Appl. No.: 17/704,613

(22) Filed: Mar. 25, 2022

(65) Prior Publication Data

US 2022/0323914 A1    Oct. 13, 2022

Related U.S. Application Data

(60) Provisional application No. 63/168,390, filed on Mar. 31, 2021.

(51) Int. Cl.
| | | |
|---|---|---|
| *B01D 71/02* | (2006.01) | |
| *B01D 17/00* | (2006.01) | |
| *B01D 17/02* | (2006.01) | |
| *B01D 67/00* | (2006.01) | |
| *B01D 69/02* | (2006.01) | |

(Continued)

(52) U.S. Cl.
CPC ........... *B01D 71/021* (2013.01); *B01D 17/02* (2013.01); *B01D 17/085* (2013.01); *B01D 67/0093* (2013.01); *B01D 69/02* (2013.01); *B01D 71/34* (2013.01); *B01D 71/36* (2013.01); *B01D 71/70* (2013.01); *C02F 1/44* (2013.01); *B01D 2325/38* (2013.01); *C02F 2101/30* (2013.01)

(58) Field of Classification Search
None
See application file for complete search history.

(56) References Cited

U.S. PATENT DOCUMENTS

| | | | |
|---|---|---|---|
| 9,085,476 B2 | 7/2015 | Sirkar | |
| 2015/0096935 A1* | 4/2015 | Mitra | ................. B01D 71/021 |
| | | | 210/500.33 |
| 2022/0176321 A1 | 6/2022 | Mitra et al. | |

FOREIGN PATENT DOCUMENTS

| | | | | |
|---|---|---|---|---|
| CN | 110420567 A | * | 11/2019 | ........... B01D 61/364 |
| WO | WO-2022038344 A1 | * | 2/2022 | |

OTHER PUBLICATIONS

Oindrila Gupta, et al., Enhanced membrane distillation of organic solvents from their aqueous mixtures using a carbon nanotube immobilized membrane, Journal of Membrane Science, vol. 568, 2018, pp. 134-140 (Year: 2018).*

(Continued)

*Primary Examiner* — Jason M Greene
*Assistant Examiner* — Eric J McCullough
(74) *Attorney, Agent, or Firm* — Rangarajan Sourirajan; RAJAN LAW OFFICE LLC

(57) ABSTRACT

A nanocarbon immobilized membrane (NCIM) is disclosed. The nanocarbon immobilized membrane is sized to purify different organic-water mixtures. The nanocarbon immobilized membrane can be used to purify solvents, fuels, and other organic compounds. Data using heptane-water, octane-water, fuel-water, and paint thinner-water show 99.9% separation efficiency. High organic flux is also seen at relatively low pressure. This approach has numerous applications, including fuel purification, oil spills clean-up, separation of commercial emulsions, and solvent purification.

14 Claims, 11 Drawing Sheets

(51) Int. Cl.
    *B01D 71/34*     (2006.01)
    *B01D 71/36*     (2006.01)
    *B01D 71/70*     (2006.01)
    *C02F 1/44*     (2023.01)
    *C02F 101/30*     (2006.01)

(56) References Cited

OTHER PUBLICATIONS

Korotney, Water Phase Separation in Oxygenated Gasoline, Memorandum, 1995, 6 pages.
Tharwat, et al., Formation and Stability of Nano-Emulsions, Advances in Colloid and Interface Science, 2004. 9: p. 108-109.
Hu, et al., Influence of Membrane Material and Corrugation and Process Conditions on Emulsion Microfiltration. Journal of Membrane Science, 2007, 294 (1-2): p. 30-39.
Lu, et al., Hyperlenses and Metalenses for Far-Field Super-Resolution Imaging, Nature Communications, 2012. 3(1): p. 1-9.
U.S. Appl. No. 63/168,390, filed Mar. 31, 2021.

\* cited by examiner

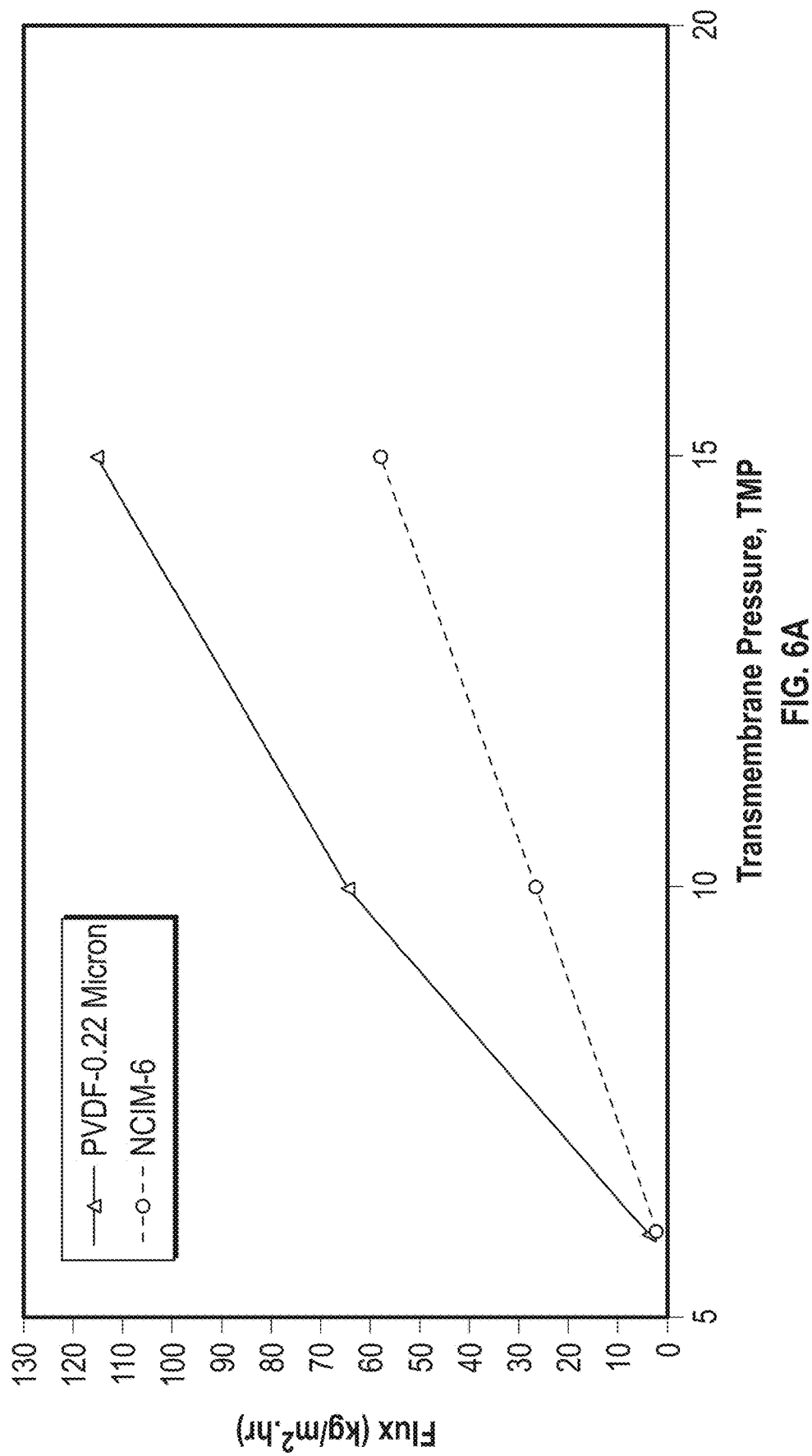

NANOCARBON ENHANCED MEMBRANE FOR PURIFICATION AND DEWATERING OF SOLVENTS AND FUELS

CROSS-REFERENCE TO RELATED APPLICATION

The present application claims priority benefit to a provisional patent application entitled "Nanocarbon Enhanced Membrane for Purification and Dewatering of Solvents and Fuels," which was filed on Mar. 31, 2021, and assigned Ser. No. 63/168,390. The entire content of the foregoing provisional application is incorporated herein by reference.

STATEMENT REGARDING FEDERALLY SPONSORED RESEARCH

This invention was made with government support under Agreement No. 1603314 awarded by the NSF. The government has certain rights in the invention.

FIELD OF THE DISCLOSURE

The present disclosure relates to nanocarbon immobilized membranes (NCIMs) that may be used in various applications, e.g., to purify different organic-water mixtures.

BACKGROUND

The separation of water from fluid systems, including systems that include only trace amounts of water, is critical to generate high purity solvents, including alkanes, paint thinners, alcohols, and fuels, such as gasoline and kerosene. Dewatering of solvents is important in various contexts, e.g., to generate high purity solvents and represents an important issue in recycling. The contaminated water that may be present in solvents can form an immiscible layer or an emulsion. For example, water in gasoline can affect engine performance. High purity fuels, gasoline, kerosene, paint thinners, and biofuels are important industrial products.

In a typical immiscible organic-water mixture, as many as four different phases, including organics, organic-in-water or water-in-organic emulsions and water, may co-exist. [See, e.g., Korotney, D., *Water Phase Separation in Oxygenated Gasoline*, Recuperado el, 1995. 24; Tharwat, T., et al., *Formation and stability of nano-emulsions*, Advances in Colloid and Interface Science, 2004. 9: p. 108-109.] An efficient and economic separation process to remove the water is highly desired. Conventional techniques include gravity separators, adsorbents, and skimming techniques. [See, e.g., Lu, D. and Z. Liu, *Hyperlenses and metalenses for far-field super-resolution imaging*, Nature communications, 2012. 3(1): p. 1-9.]

Membrane-based technologies are becoming attractive alternatives due to relatively less energy requirement, cost effectiveness, custom fabrication, and wide application range. Conventional hydrophilic membranes can be employed for gravity-driven separations, but would not be effective to restrict the permeation of free organic-water mixture or water in organic emulsion. [See, e.g., Lu, D. and Z. Liu, *Hyperlenses and metalenses for far-field super-resolution imaging*, Nature communications, 2012, 3(1): p. 1-9.] Typically, hydrophobic and oleophilic (contact angle with organic solvents is <90°) membranes are used in a crossflow filtration system to avoid any formation of a barrier layer that prevents permeation of organic solvents. However, these membranes are prone to fouling by organic solvents during demulsification. [See, e.g., Hu, B. and K. Scott, *Influence of membrane material and corrugation and process conditions on emulsion microfiltration*. Journal of membrane science, 2007, 294 (1-2): p. 30-39.]

Gasoline and kerosene are petroleum-based fuels. Petroleum refineries and blending facilities produce motor gasoline for sale at retail gasoline fueling stations. Most of the gasoline that petroleum refineries produce is unfinished gasoline or gasoline blend stocks. Gasoline blend stocks require blending with other liquids to make finished motor gasoline, which meets the basic requirements for fuel that is suitable for use in spark ignition engines.

Kerosene is mainly composed of a mixture of hydrocarbons, typically 10-16 carbon atoms per molecule, miscible with petroleum solvents but immiscible in water. One of the most important and the largest uses of kerosene is as fuel for aircraft jet engines and some rocket engines. In jet airlines, the fuel is used quickly and, as a safety measure, the fuel tanks may be slumped on a regular basis, which helps to remove any water present in the tank. Further, if the fuel is stored for a longer period, condensation may occur on the fuel due to temperature changes, which causes expansion and contraction. The water phase separation becomes more important with the introduction of oxygenated gasoline, which has more affinity toward water. [See, e.g., Korotney, D., *Water Phase Separation in Oxygenated Gasoline*, Recuperado el, 1995. 24.] The contaminated water not only reduces its efficiency and uniformity, but also lead to mechanical damage. Maintaining high purity and recovering kerosene from waste slumped product is highly important from both an economic and ecological point of view.

Removing water from solvents is equally important. Organic solvents, such as benzene, toluene, and xylenes (BTX), are used in a wide range of manufacturing processes and commercial products. Octane and heptane are hydrocarbons with the chemical formula $C_8H_{18}$ and $C_7H_{16}$, and are components of gasoline (petrol). The water present in gasoline affects engine performance and durability. Heptane or n-heptane, a straight chain alkane ($C_7H_{16}$), is widely used in laboratories as a non-polar solvent. Other important solvents include alcohol, acetone, and methyl ethyl ketone.

The solvents have wide industrial use to produce plastic, paints, glues, solvents, and serve as intermediates to produce other chemical substances. Paint thinners are mixtures of volatile organic compounds that are commonly used to dilute paints, inks, adhesives, and as cleaning agents for different purposes. Paint thinners can also be used to 'thin' or reduce the viscosity of paint so they can be used in sprayer applicators. Release of volatile organic solvents to atmosphere can increase the level of ozone and photochemical pollutants leading to adverse effects in public health. Equipment, process modification, improved operating practices, and recycling can lead to lower emission rates of organic solvents.

For at least the foregoing reasons, it would be desirable to enhance the separation of water contamination from fuels and solvents.

Pervaporation (PV) has been extensively used in solvent separation, where a dense nonporous membrane is used. In PV, the membrane preferentially absorbs a particular component from a miscible liquid mixture, and the adsorbed component diffuses selectively across the membrane due to the concentration gradient between the feed and the permeate side. The permeate side is often kept under vacuum, so the component permeates as a vapor.

PV is used extensively on systems which are difficult to separate by existing separation processes, such as distillation, adsorption, and extraction. PV has been used in applications such as the removal of water from a water-organic solution at low water concentrations, separation of organics from its aqueous solution when organic concentration is low, and the separation of an organic-organic miscible system. PV works with miscible systems.

However, PV has limitations, such as low permeation rate, limited feed concentration range, and lack of membrane stability as the membrane absorbs the permeate.

It would be desirable to improve PV-related performance, particularly in view of the limitations noted above.

SUMMARY

In accordance with embodiments of the present disclosure, an advantageous nanocarbon membrane and membrane separation system are disclosed, as well as a process that utilizes a nanocarbon membrane module to effect desired separations. In one embodiment, a nanocarbon is immobilized on a membrane to selectively remove water. The nanocarbon is sized to prevent water from passing through the membrane by serving as a selective filter. The nanocarbon is configured such that the membrane exhibits super hydrophobic properties.

For purposes of the present disclosure, nanocarbons of all types are included and may be used, such as carbon nanotubes (CNTs), graphene oxide (GO), and reduced graphene oxide (r-GO). A hybrid nanocarbon could be employed according to exemplary embodiments of the present disclosure. For example, the hybrid nanocarbon could include CNTs and r-GO or CNTs and GO. It will be understood by persons skilled in the art that other suitable membranes, including other hybrid membranes, may be employed based on the disclosure herein.

In another embodiment of the present disclosure, the membrane surface and pores associated with the membrane surface (i.e., opening onto the surface of the membrane) are chemically modified with fluoroalkylsilane perfluorooctyl-triethoxysilane (FAS), e.g., through a dip-coating process. The incorporation of FAS on the membrane surface and within its pores improved the hydrophobicity of the membrane. Water contact angle was observed to increase significantly. It will be understood that other compounds could be used to improve the hydrophobicity of the membrane. The separation performance of the membrane is further improved by introduction of nanocarbons (such as CNTs, GOs, rGOs and hybrids thereof) during a phase inversion process or after surface modification, e.g., with FAS.

In one embodiment, a membrane separation system includes a membrane module and a nanocarbon immobilized membrane used to separate an organic solvent.

In exemplary embodiments of the present disclosure, a porous membrane is employed in a selective filtration mode that is applicable with immiscible systems. In advantageous implementations of the disclosed porous membrane, there are no concentration-related limitations on system operations. The disclosed process has a very high permeation rate, and the permeation could take place in a liquid phase.

Immobilized nanocarbons (NCs) in different types of membranes are disclosed herein, e.g., a NCIM, and the disclosed membranes alter the solute-membrane interactions. The disclosed membranes may be used in a variety of applications, such as liquid-liquid extraction, pervaporation, nanofiltration, and removing volatile organics from air. The NCs, especially CNTs, are known to have rapid sorption and desorption capacities leading to rapid mass transfer. According to the present disclosure, advantageous NC-related contributions are noted relative to improving potential fouling behavior due to a screening effect and enhanced electrostatic repulsion between the membrane and potential foulant(s).

Immobilizing NCs, such as CNTs, in the pores may beneficially alter the solvent or fuel-membrane interactions, which is one of the major physicochemical factors affecting the permeability and selectivity of membrane(s). The NCs serve as paths for organic solvent transport and high flux can result from transport along the smooth walls of CNTs as well as molecular ordering inside the nano pores. The highly hydrophobic nature of CNTs also decreases the tendency of pores to become wet with aqueous solution so that higher transport of pure organic solvent can occur.

In one embodiment, a filtering process includes at least one NCIM module, such as a nanocarbon immobilized membrane module. The filtering process may advantageously include a membrane module containing the membrane, feed and permeate inlets and outlets, and one or more flow pumps, such as a feed pump.

Any combination and/or permutation of the embodiments disclosed herein is envisioned. Other objects and features will become apparent from the following detailed description considered in conjunction with the accompanying drawings. It is to be understood, however, that the drawings are provided as an illustration only and not as a definition of the limits of the present disclosure.

BRIEF DESCRIPTION OF THE DRAWINGS

To assist those of skill in the art in making and using the disclosed nanocarbon immobilized membrane and associated systems and methods, reference is made to the accompanying figures, wherein:

FIG. 6A is a graphical depiction showing the effect of transmembrane pressure on octane flux at 500 ppm water in feed for PVDF 0.22 unmodified and NCIM-M membrane;

DETAILED DESCRIPTION

Figure 1A:
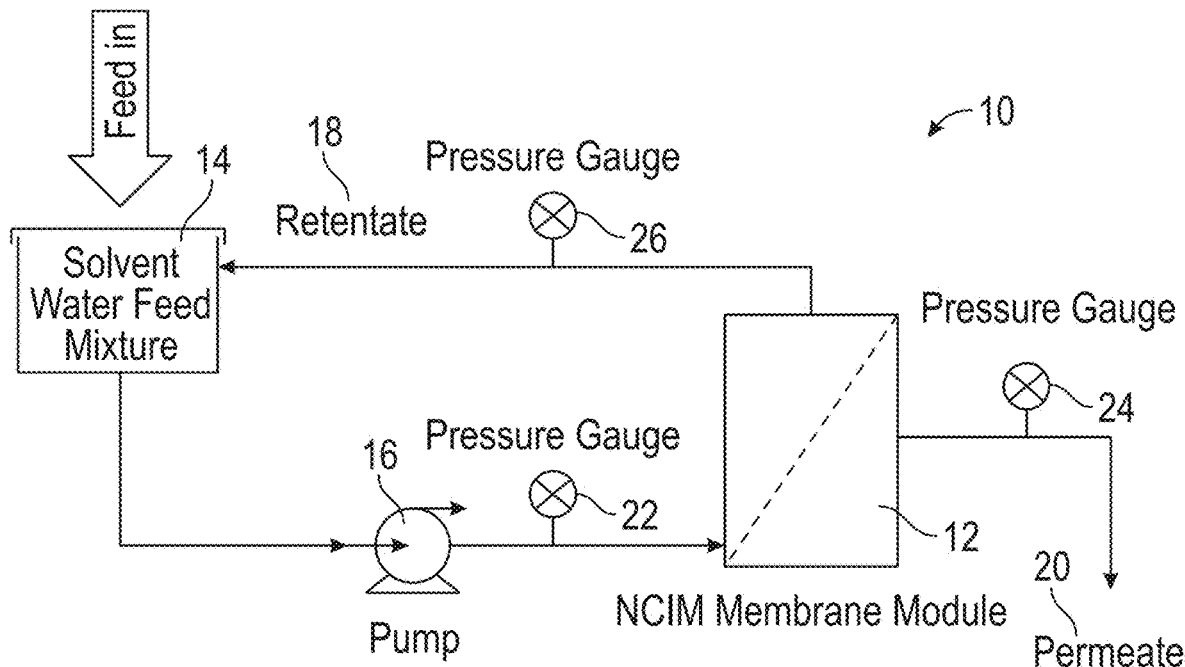
FIG. 1A is a schematic diagram of an exemplary setup of a filtration process in accordance with embodiment(s) of the present disclosure.

The present disclosure now will be described more fully hereinafter with reference to the accompanying drawings, in which illustrative embodiments of the invention are shown. In the drawings, the relative sizes of regions or features may be exaggerated for clarity. This present disclosure may, however, be embodied in many different forms and should not be construed as limited to the embodiments set forth herein; rather, these embodiments are provided so that this disclosure will be thorough and complete, and will fully convey the scope of the invention to those skilled in the art. Well-known functions or constructions may not be described in detail for brevity and/or clarity.

The terminology used herein is to describe particular embodiments only and is not intended to limit the scope of the invention. As used herein, the singular forms "a", "an" and "the" are intended to include the plural forms as well, unless the context clearly indicates otherwise. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are directed to a nanocarbon immobilized membrane (NCIM). Although discussed herein with respect to a carbon nanotube, it should be understood that embodiments can generally be applied to other nanocarbons, such as graphene oxide (GO) and reduced graphene oxide (r-GO).

A first exemplary embodiment of a filtration system according to the present disclosure is disclosed below. The system includes subsystems and components to measure and control process variables, such as pressure, as required for effective performance. The system could employ sensors or other condition detection and control subsystems or components that might be required to process at a particular rate or at a particular scale, as will be readily apparent to persons skilled in the art.

Referring to FIG. 1A, an exemplary embodiment of a filtration system 10 according to the present disclosure includes a NCIM module 12, such as a nanocarbon immobilized membrane module. In this embodiment, a flat membrane module is used. It will be understood that other suitable types of membrane modules could be employed, such as a hollow fiber membrane module or a spiral wound membrane module.

The setup could include one or more pumps, and a feed mixture 14, such as a solvent water feed mixture or a fuel water feed mixture. A pump 16 is used to pump the feed mixture 14 through the membrane module 12, a portion of which is recirculated and collected as the retentate 18 while the permeate 20 is recovered from the system 10. Pressure gauges 22, 24, 26 are positioned at various points in the system 10 to monitor pressure conditions.

The materials and the methods of the present disclosure used in one embodiment will now be further described below. While the noted embodiment discusses the use of specific compounds and materials, it is to be understood that the present disclosure could employ other suitable compounds or materials. Similar quantities or measurements may be substituted without altering the method embodied below.

Heptane and octane are used as surrogate solvents as well as fuels in these exemplary implementations of the disclosed method. Materials include heptane, octane (Fisher Scientific Ltd.), kerosene (Fisher Scientific Ltd), paint thinner (Klean-Strip® Paint Thinner, Home Depot, Newark, NJ), deionized water (Barnstead 5023, Dubuque, Iowa), and multi-walled CNTS (MWCNTs) (Cheap Tubes Inc., Brattleboro, VT). The average diameter and length of the CNTs is generally ~30 nm and 15 µm, respectively, although the present disclosure is not limited by or to such exemplary dimensional properties. A porous composite polytetrafluoroethylene (PTFE) membrane on a polypropylene (PP) support layer and polyvinylidene difluoride (PVDF) may be used in exemplary implementations of the disclosed methods.

In one embodiment, the CNTs could be single walled. In one embodiment, the CNTs could be carboxyl functionalized.

In one embodiment, CNTs were dispersed in a solution containing acetone along with a small amount of polyvinylidene difluoride (PVDF) and sonicated for four hours. The PVDF solution acted as a binder during nanomaterial immobilization. The PVDF-nanomaterial dispersion was thereafter coated uniformly over the membrane surface to incorporate the CNTs, and then allowed to dry overnight under the hood to allow the acetone to evaporate. Different amounts of CNTs have been used to fabricate the NCIM and an optimized NC concentration has been determined. Three membranes were fabricated with low concentration, medium, and higher concentrations of CNTs and are referred to as NCIM-X, where X is the percentage of CNTs. For example, NCIM-6 contains six percent CNTs.

In this embodiment, a digital gear pump (Cole Parmer) was used to pump the solvent-water or fuel-water feed mixture through the membrane module and was recirculated and collected as the retentate. Different feed concentrations were prepared by adding water to octane from 50 ppm to 500 ppm, heptane from 50 ppm to 500 ppm, kerosene from 50 ppm to 500 ppm, and paint thinner from 5 to 20 wt %.

The pressure of the solvent-water or kerosene-water feed mixture was controlled using a pressure controller valve and measured by a pressure gauge. The feed pressure varied between 6 to 20 psig. The feed flow rate was 40 mL/min as measured and was monitored by a flowmeter (Cole Parmer).

Figure 1B:
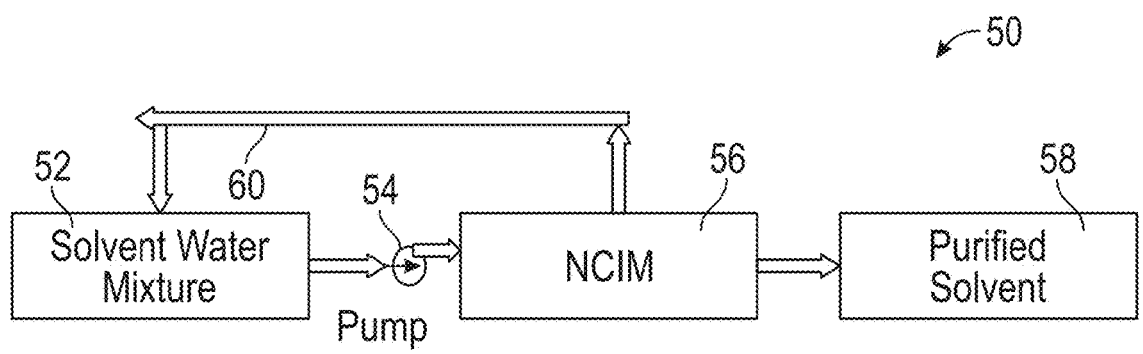
FIG. 1B is a diagram of the filtration process.

The overall filtration process is schematically depicted by system 50 in FIG. 1B. The solvent water feed mixture 52 is pumped by pump 54 to the membrane module 56. A portion of the feed mixture passes through the membrane module as purified solvent 58 and the remaining portion, the retentate 60, is recycled to the feed tank for the solvent water feed mixture 52.

Figure 2A:
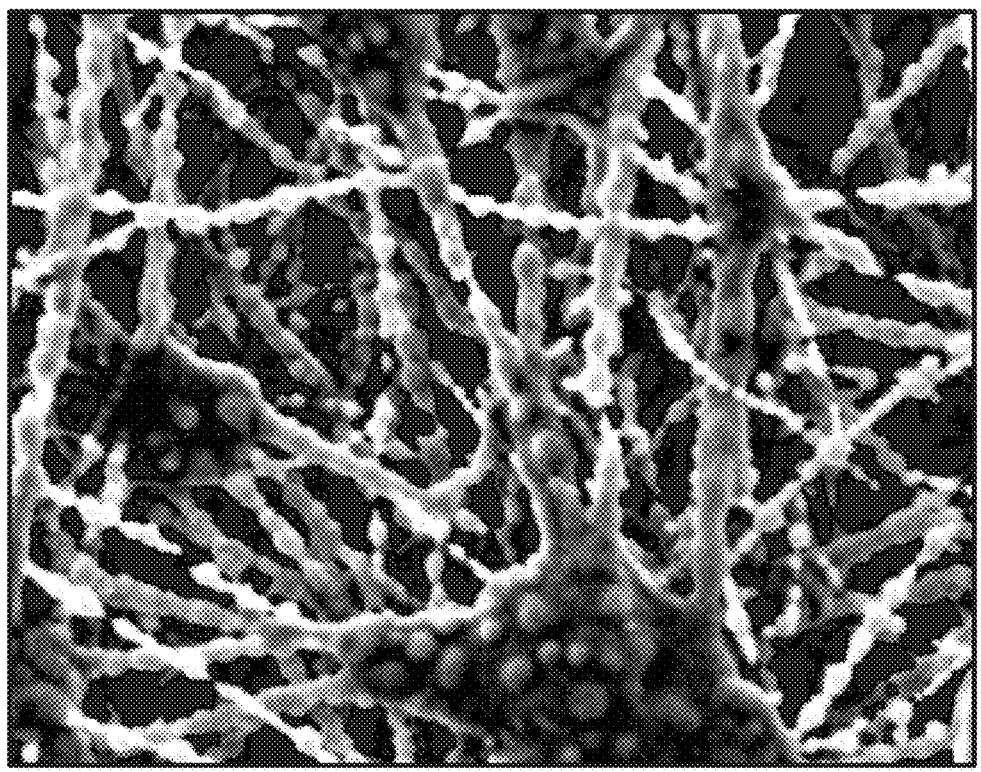
FIG. 2A is an SEM image of the surface of an unmodified PTFE 0.1-micron membrane.
Figure 2B:
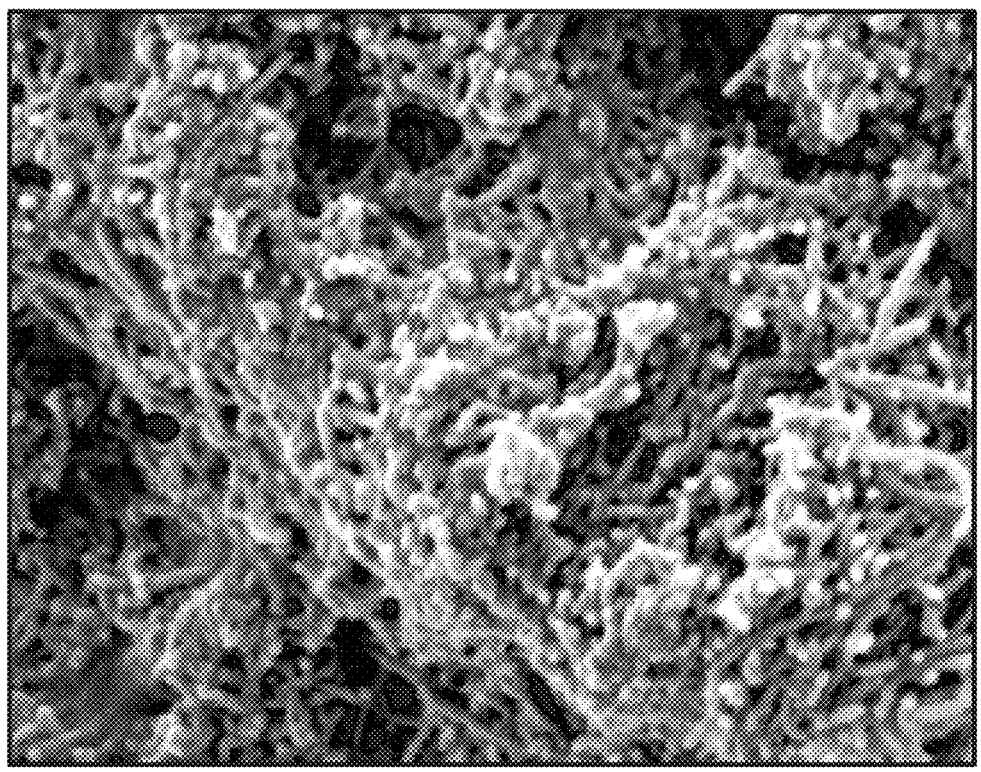
FIG. 2B is an SEM image of the surface of a PTFE NCIM membrane.

The SEM images of the unmodified PTFE (0.1-micron PTFE) and the NCIM membrane (0.1-micron PTFE, NCIM) are illustrated in FIGS. 2A and 2B. The uniform distribution of CNTs was observed over the entire membrane surface. The SEM image shows the porous structure of the pristine membranes and presence of CNTs on the membrane.

Figure 3A:
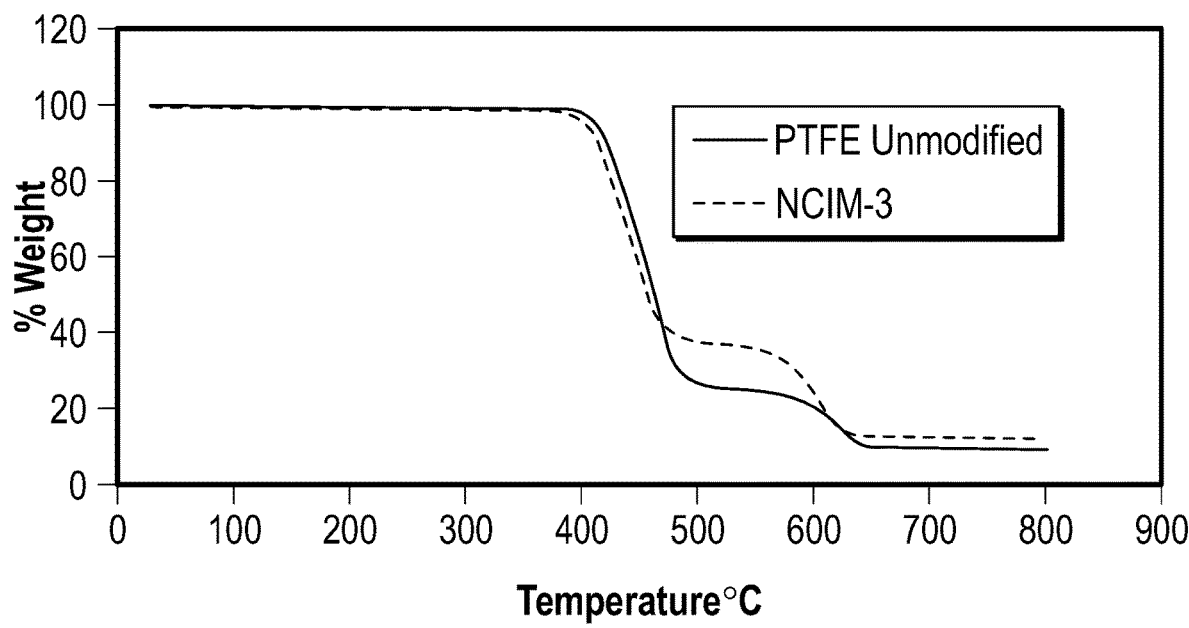
FIG. 3A is a graphical depiction of a thermogravimetric analysis (TGA) of a PTFE membrane with a pore size of 0.1 micron.
Figure 3B:
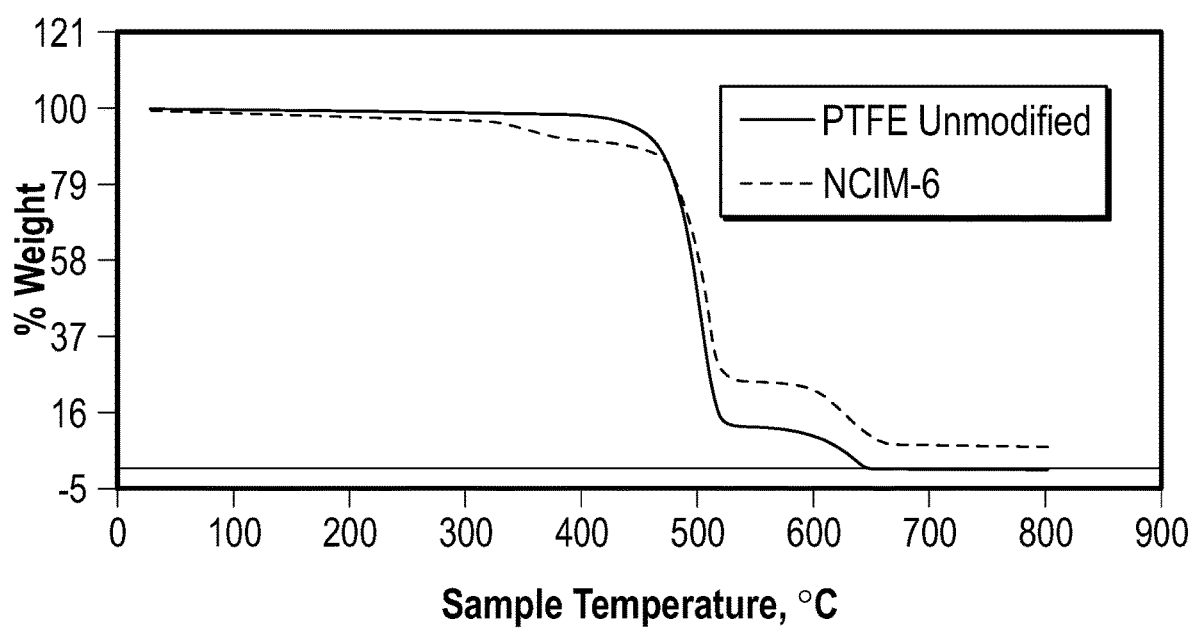
FIG. 3B is a graphical depiction of a TGA analysis of a PTFE membrane with a pore size of 0.22 micron.

Thermal stability of the unmodified and NCIM membrane was studied by thermogravimetric analysis (TGA). The thermal stability of the membranes in presence of CNTs increased, as shown in FIGS. 3A and 3B.

The water contact angles of the unmodified membranes and NCIM are shown in Table 1. A droplet size of 4 mm was used to measure contact angles. The presence of CNTs dramatically altered the contact angle. The water contact angle for NCIM was higher than the unmodified membranes, which demonstrates the water repelling ability of NCIM.

TABLE 1

Water Contact Angle for prepared membranes

| Membrane | Contact Angle |
|---|---|
| 0.1-micron PTFE | 120° |
| 0.22-micron PTFE | 109° |
| 0.22-micron PVDF | 92° |
| 0.1 PTFE NCIM-3 | 134° |
| 0.22 PTFE NCIM-6 | 122° |
| 0.22 PVDF NCIM-6 | 132° |

The percentage rejection of water (R %) is defined as:

$$R(\%) = (1 - (C_{permeate}/C_{feed})) \times 100 \quad (1)$$

Where, $C_{permeate}$ and $C_{feed}$ are the concentration of water in permeate and feed, respectively. The transmembrane pressure ($\Delta P$) is defined as the pressure difference across the membrane. The solvent flux at a particular $\Delta P$ is obtained from, $$\text{Solvent flux} = \frac{\text{Amount of solvent in the permeate side}}{\text{Membrane area} \times \text{experiment time}} \quad (2)$$

The membranes prepared using different MWCNTs concentrations of 5 mg, 10 mg, and 15 mg in PTFE and PVDF membrane with different pore sizes are termed as NCIM LOW (NCIM-L), NCIM MEDIUM (NCIM-M), and NCIM HIGH (NCIM-H), as shown in Table 2 below.

FIGS. 4A, 4B, 5A, 5B, 6A and 6B illustrate the effect of transmembrane pressure on octane flux and water rejection, respectively. It can be seen from the figures that solvent flux increases sharply with an increase in transmembrane pressure for all membranes. The water rejection decreased slightly with an increase in transmembrane pressure for unmodified and the NCIM membranes. Similar trends have been observed for all PVDF and PTFE membranes.

Figure 4A:
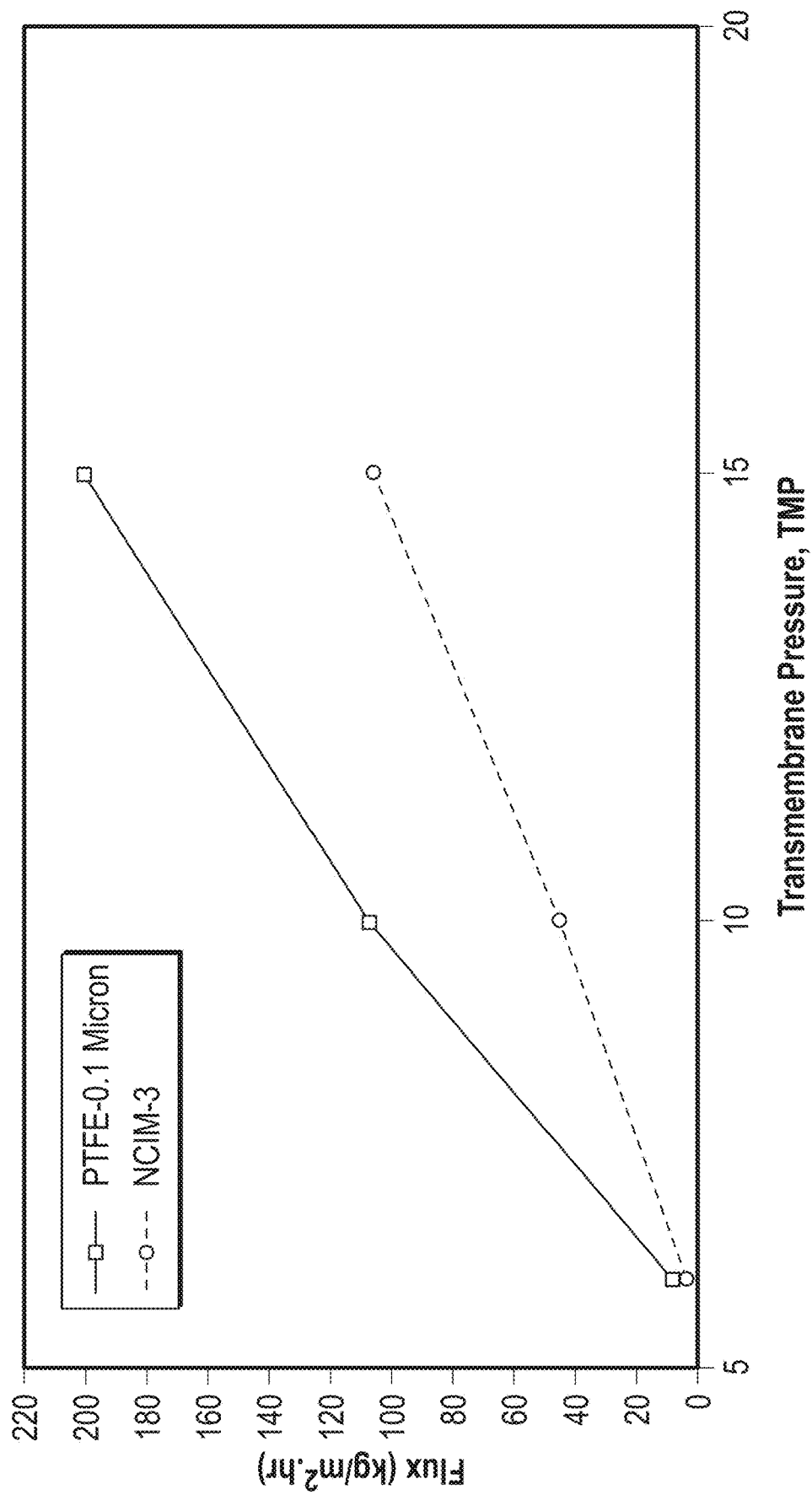
FIG. 4A is a graphical depiction showing the effect of transmembrane pressure on octane flux at 500 ppm water in feed for PTFE 0.1 unmodified and NCIM-M membrane.
Figure 4B:
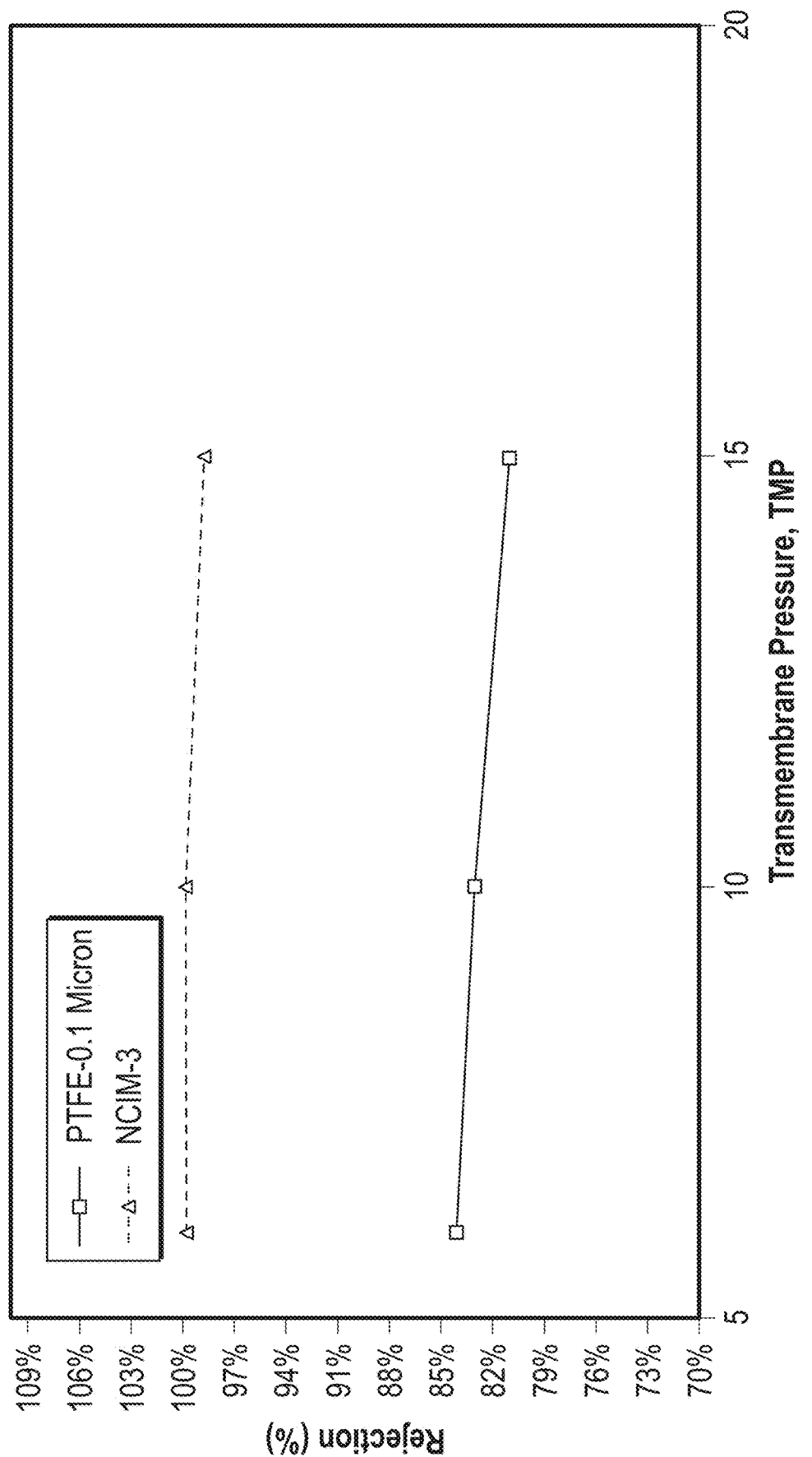
FIG. 4B is a graphical depiction showing the effect of transmembrane pressure on water rejection at 500 ppm water in feed for PTFE 0.1 unmodified and NCIM-M membrane.

FIGS. 4A and 4B show the octane flux and water rejection for octane-water system with NCIM-M on PVDF and PTFE base membranes. The water rejection for unmodified membranes was much lower compared to NCIM. A significant improvement in water rejection was observed with the addition of CNTs. The water rejection was high at a certain pressure range followed by a decreasing trend after a certain pressure point.

Figure 5A:
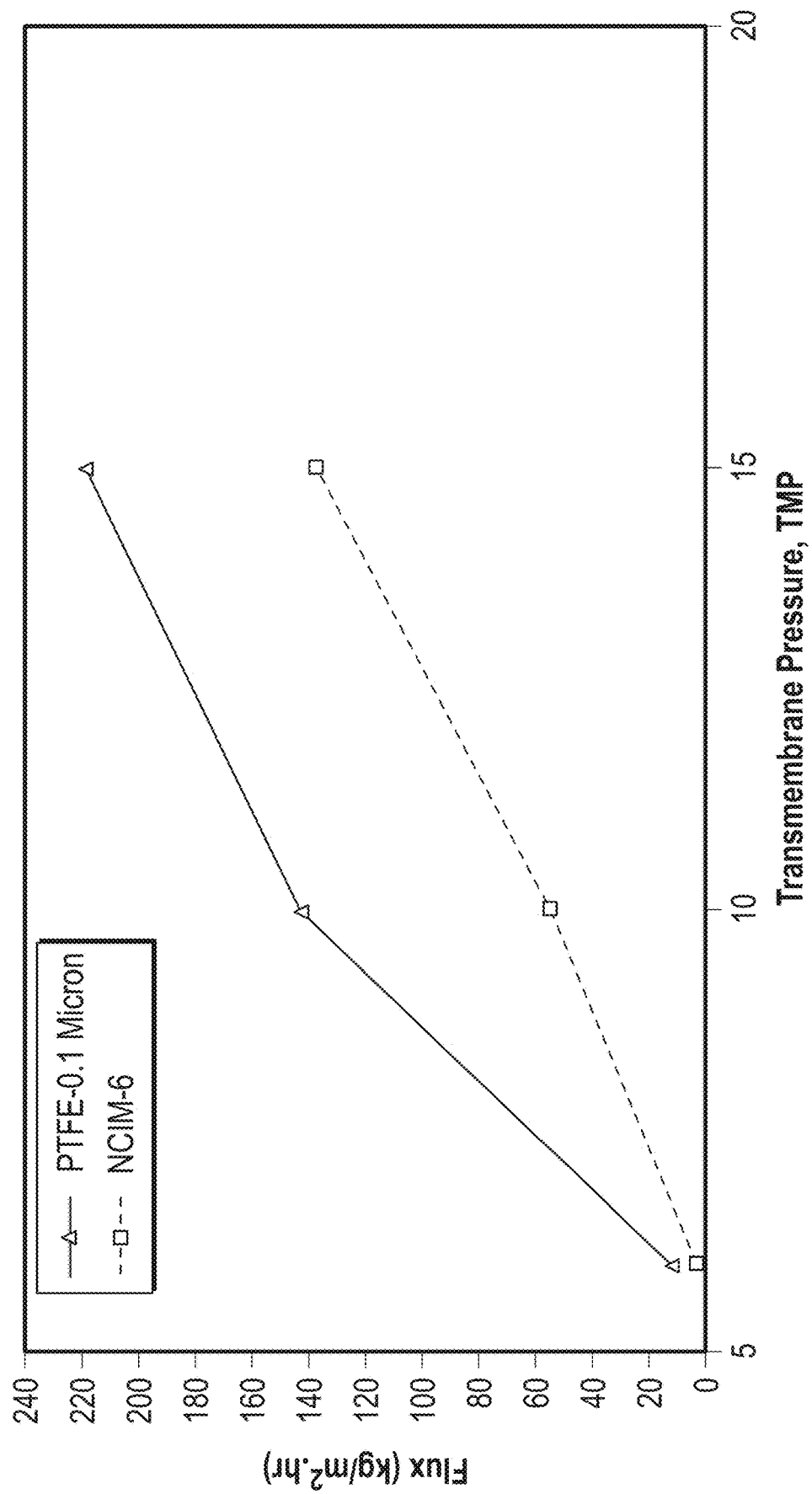
FIG. 5A is a graphical depiction showing the effect of transmembrane pressure on octane flux at 500 ppm water in feed for PTFE 0.22 unmodified and NCIM-M membrane.
Figure 5B:
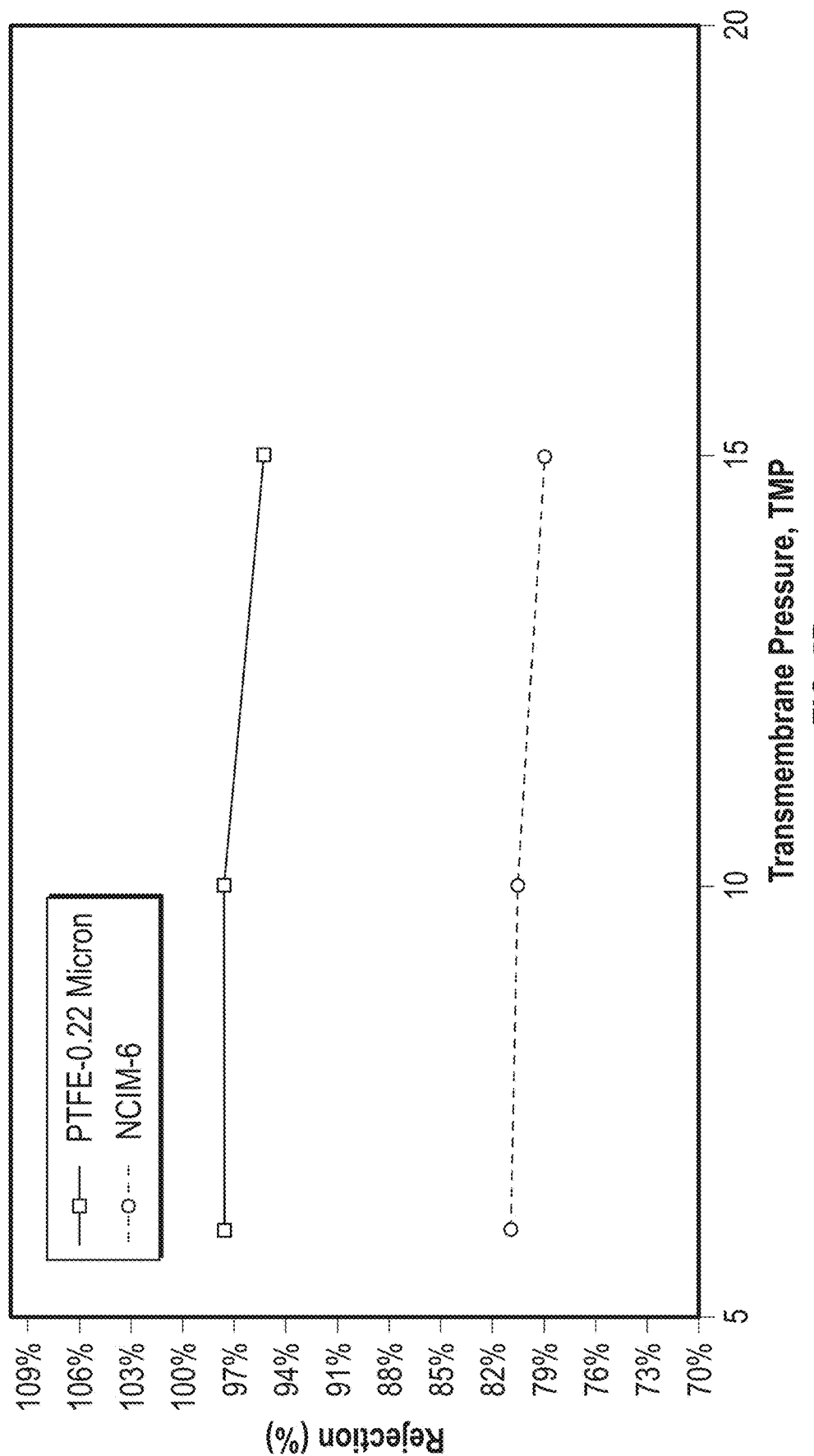
FIG. 5B is a graphical depiction showing the effect of transmembrane pressure on water rejection at 500 ppm water in feed for PTFE 0.22 unmodified and NCIM-M membrane.

FIGS. 5A and 5B show the effect of transmembrane pressure on octane flux and water rejection at 500 ppm water in feed for PTFE 0.22 unmodified and NCIM-M membrane. The water rejection for unmodified membranes was much lower compared to NCIM. A significant improvement in water rejection was observed with the addition of CNTs.

Figure 6B:
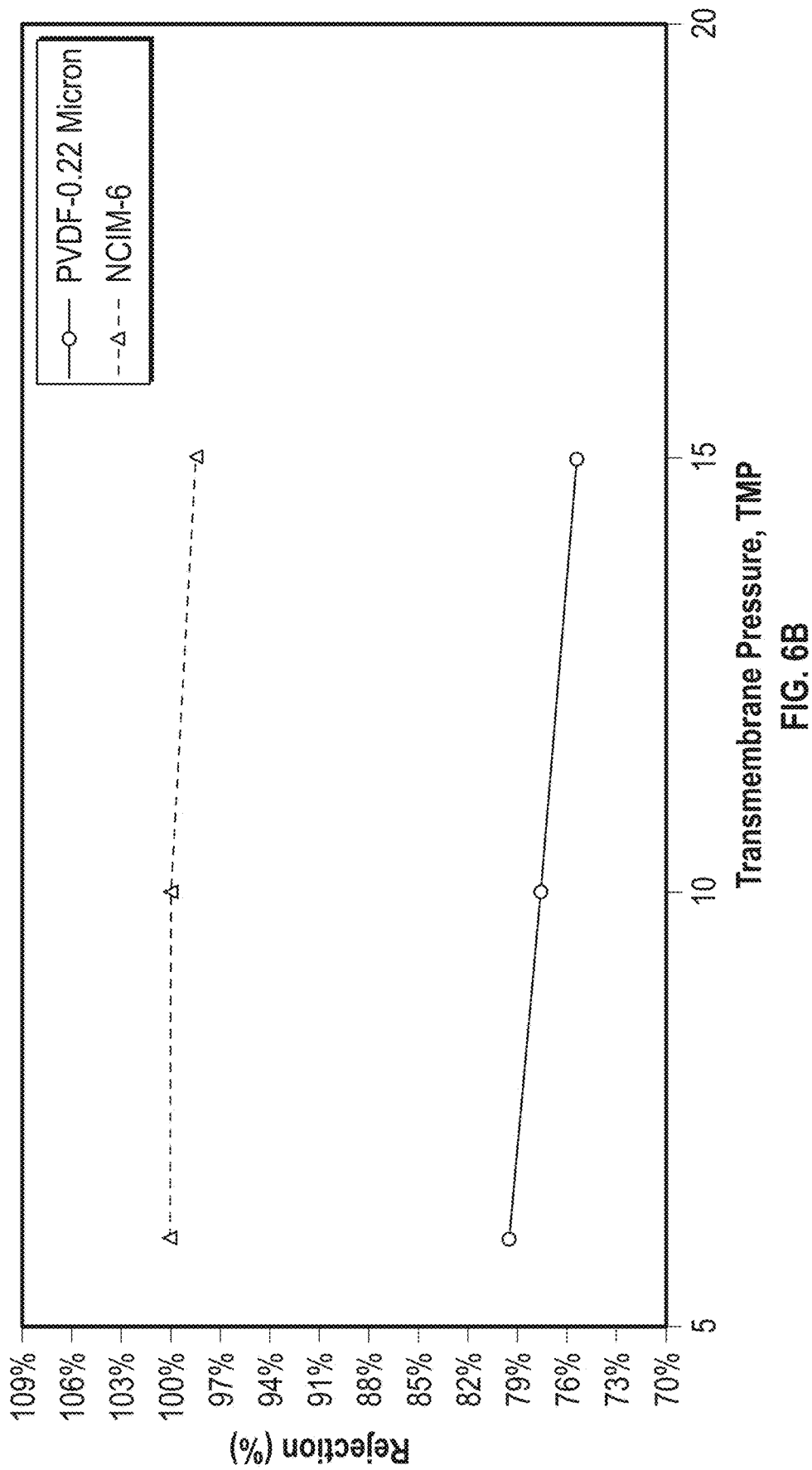
FIG. 6B is a graphical depiction showing the effect of transmembrane pressure on water rejection at 500 ppm water in feed for PVDF 0.22 unmodified and NCIM-M membrane.

FIGS. 6A and 6B show the effect of transmembrane pressure on octane flux and water rejection at 500 ppm water in feed for PVDF 0.22 unmodified and NCIM-M membrane. The water rejection for unmodified membranes was much lower compared to NCIM. A significant improvement in water rejection was observed with the addition of CNTs.

Figure 7A:
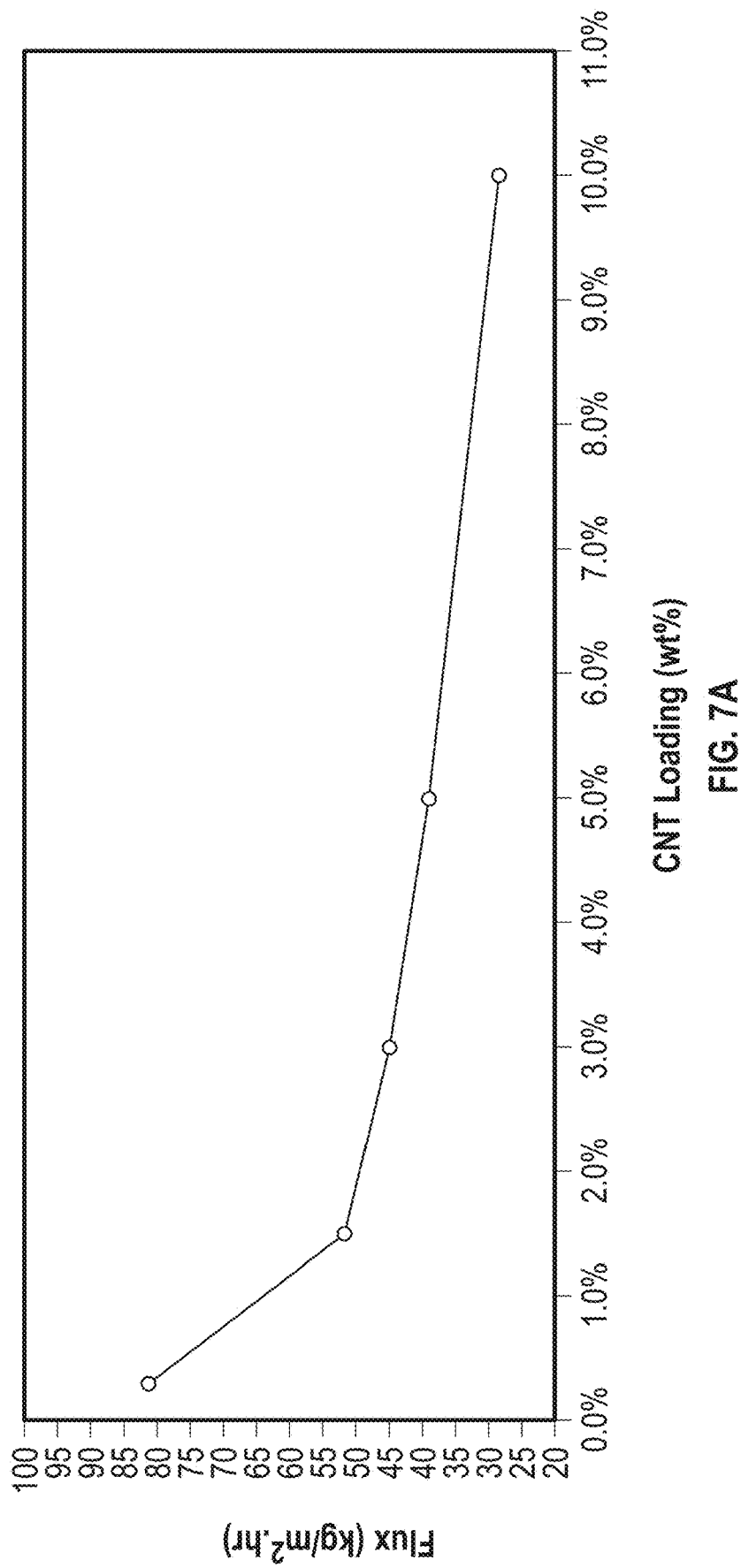
FIG. 7A is a graphical depiction showing the effect of CNT loading on membrane on octane flux at 500 ppm water in feed and 10 psig pressure for PTFE 0.1-micron NCIM-3 membrane; and, FIG. 7B is a graphical depiction showing the effect of CNT loading on membrane on water rejection at 500 ppm water in feed and 10 psig pressure for PTFE 0.1-micron NCIM-3 membrane.
Figure 7B:
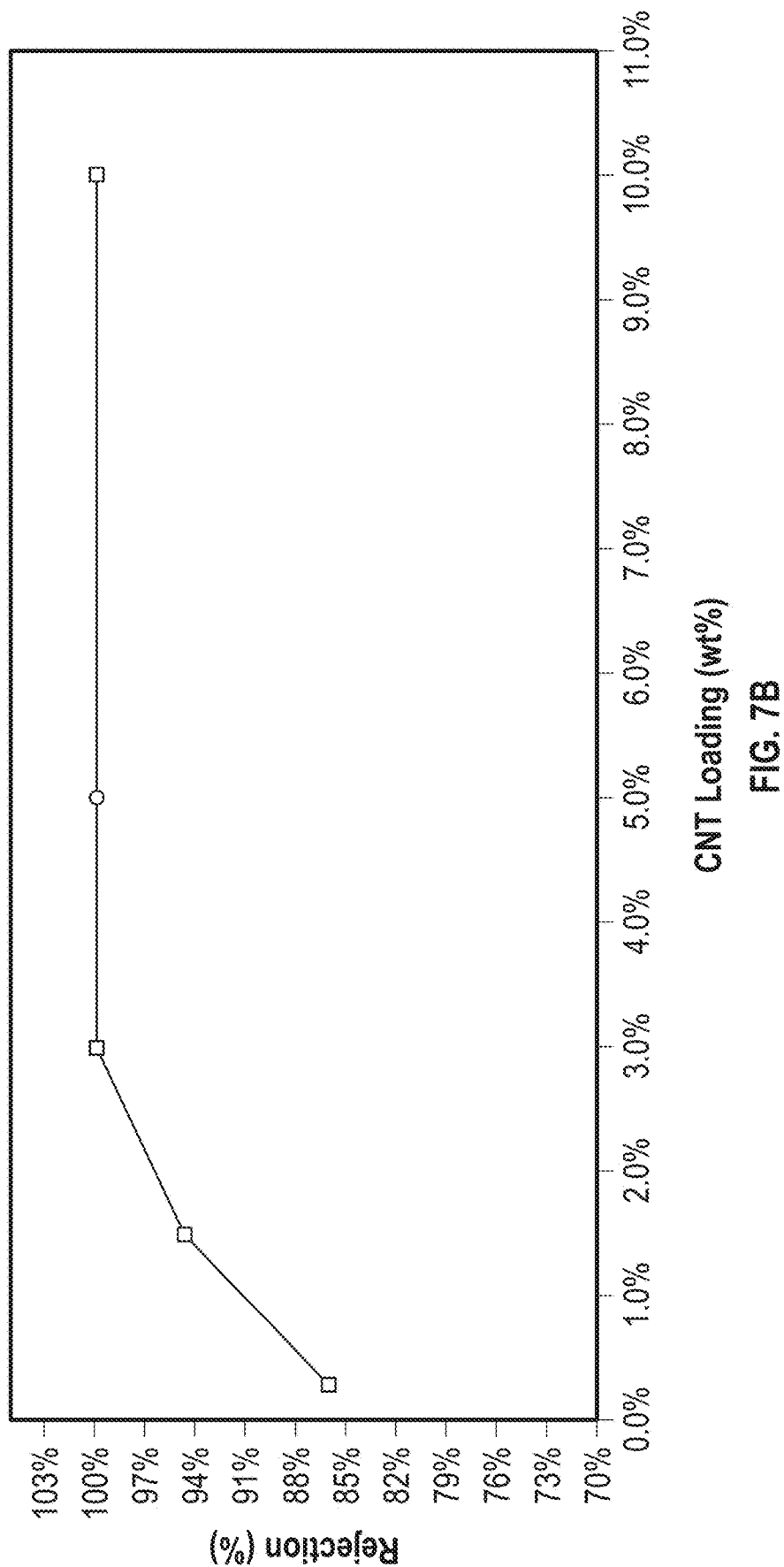

FIGS. 7A and 7B show the effect of CNT loading on octane flux and water rejection at 500 ppm water in feed and 10 psig pressure for a PTFE 0.1-micron NCIM membrane. The water rejection for unmodified membranes was much lower compared to NCIM. A significant improvement in water rejection was observed with the addition of CNTs.

Removal of Water from Fuel:

It can be seen from Table 1a and Table 1b that the NCIM significantly improved the water rejection for both membranes. The heptane flux remains comparable for both unmodified membrane and NCIM. Between the PTFE and PVDF membranes, the PVDF membrane exhibits better water rejection with low heptane flux, which may be due to the high hydrophobicity of PVDF membrane and denser membrane compared to PTFE membrane.

TABLE 1a

Effect of heptane flux and water rejection at various water concentration for PTFE 0.1-micron membrane and NCIM-M at 10 psig transmembrane pressure.

| | PTFE 0.1 micron | | | NCIM-3 | | |
|---|---|---|---|---|---|---|
| Water concentration (ppm) | Flux (kg/m² · hr) | Water concentration Permeate (ppm) | Rejection (% R) | Flux (kg/m² · hr) | Water concentration Permeate (ppm) | Rejection (% R) |
| 50 | 134.65 | 9.1 | 81.75% | 53.932 | 0.6 | 98.80% |
| 100 | 133.56 | 17.9 | 82.10% | 50.78 | 1.2 | 98.80% |
| 200 | 128.8 | 34.3 | 82.85% | 49.57 | 2.22 | 98.89% |
| 500 | 119.43 | 85.0 | 83.0% | 45.947 | 0.1 | 99.98% |

TABLE 1b

Effect of heptane flux and water rejection at various water concentration for
PVDF 0.22-micron membrane and NCIM-M at 10 psig transmembrane pressure.

| | PVDF 0.22 micron | | | NCIM-6 | | |
|---|---|---|---|---|---|---|
| Water concentration (ppm) | Flux (kg/m² · hr) | Water concentration (ppm) | Rejection (% R) | Flux (kg/m² · hr) | Water concentration (ppm) | Rejection (% R) |
| 50  | 65.08 | 13.0  | 74.00% | 28.96 | 0.615 | 98.77% |
| 100 | 67.2  | 24.6  | 75.45% | 25.98 | 0.97  | 99.03% |
| 200 | 68.51 | 49.0  | 75.51% | 26.75 | 0.912 | 99.54% |
| 500 | 66.53 | 120.0 | 76.6%  | 27.76 | 0     | 100.00% |

Table 2 demonstrates the effect of CNTs concentrations on kerosene flux and water rejection at 500 ppm water in feed and 10 psig transmembrane pressure. The membranes prepared using different CNTs concentrations was conducted on a trial-and-error basis and an optimum concentration was chosen (NCIM-M) for separation studies. The membranes fabricated with the lower CNT concentrations and higher concentrations than the optimum value is designed as NCIM LOW (NCIM-L) and NCIM HIGH (NCIM-H), respectively. Accordingly, the low, optimum, and high concentrations of CNT are determined based on the weight percentages.

TABLE 2

Effect of MWCNTs concentration on membrane performances for kerosene water

| | PTFE 0.1 micron | | | PVDF 0.22 micron | | |
|---|---|---|---|---|---|---|
| Membranes | NCIM LOW (NCIM-.05) | NCIM MEDIUM (NCIM-3) | NCIM HIGH (NCIM-5) | NCIM LOW (NCIM-2) | NCIM MEDIUM (NCIM-6) | NCIM HIGH (NCIM-8) |
| Flux (kg/m² · hr) | 56.18 | 43.221 | 36.83 | 37.65 | 33.12 | 21.12 |
| Water rejection (% R) | 95.34% | 99.97% | 100% | 97% | 99% | 100% |

From Table 2, it is apparent that the MWCNTs concentration affects the separation performances significantly. With increased concentration, the water rejection increases dramatically. However, after reaching an optimized concentration, the kerosene flux started reducing, possibly due to the partial blockage of the membrane pores. Similar trends were observed for octane-water and heptane-water system. Tables 1a & 1b show the flux and separation performance at various water concentrations with different membranes at 10 psig transmembrane pressure for a heptane water system.

Table 3a and 3b show the flux and separation performance of various membranes for water in kerosene system at a transmembrane pressure of 10 psig with different concentrations.

TABLE 3a

Flux and rejection performance of a kerosene water system at different
concentrations for PTFE 0.1 and NCIM-M at 10 psig transmembrane pressure

| | PTFE 0.1 micron | | | NCIM-3 | | |
|---|---|---|---|---|---|---|
| Water concentration (ppm) | Flux (kg/m² · hr) | Water concentration (ppm) | Rejection (% R) | Flux (kg/m² · hr) | Water concentration (ppm) | Rejection (% R) |
| 50  | 120.11 | 9.0  | 82.00% | 48.987 | 0.05 | 99.90% |
| 100 | 121.56 | 17.3 | 82.75% | 46.879 | 1.1  | 98.90% |
| 200 | 127.65 | 34.1 | 82.97% | 45.588 | 2    | 99.00% |
| 500 | 123.48 | 83.0 | 83.4%  | 43.221 | 0.15 | 99.97% |

TABLE 3b

Flux and rejection performance of a kerosene water system at different concentrations for PTFE 0.22 and NCIM-M at 10 psig transmembrane pressure

| | PTFE 0.22 micron | | | NCIM-6 | | |
|---|---|---|---|---|---|---|
| Water concentration (ppm) | Flux (kg/m$^2$ · hr) | Water concentration (ppm) | Rejection (% R) | Flux (kg/m$^2$ · hr) | Water concentration (ppm) | Rejection (% R) |
| 50 | 130.8 | 10.5 | 79.00% | 58.103 | 1.5 | 97.00% |
| 100 | 132.64 | 20.9 | 79.10% | 57.656 | 2.96 | 97.04% |
| 200 | 134.46 | 39.8 | 80.12% | 52.9864 | 5.46 | 97.27% |
| 500 | 140.56 | 97.0 | 80.6% | 55.44 | 13.65 | 97.27% |

It can be seen from Tables 3a and 3b that NCIM-M significantly improved the water rejection for both membranes. Between these two membranes, the PTFE 0.1 micron exhibits better water rejection due to the high hydrophobicity and PTFE 0.22 exhibits high water flux due to larger porosity. The water rejection was found much higher for NCIM compared to unmodified commercial membrane. Incorporation of MWCNTs on the membrane surface did not affect the kerosene flux significantly.

Removal of Water from Paint Thinners:

Different water-thinner mixtures (5, 10, and 20 wt % water) were prepared by adding distilled water into the thinner. The water-thinner mixtures were then stirred in a closed vessel for 3 hours to prepare a water-thinner dispersion. The water-thinner immiscible mixture was then passed through the membrane module system under a vigorous stirring condition. The permeate was collected at a certain feed pressure. The flux was calculated and the rejection (%) of water was evaluated using the GC-MS analysis data. Table 4a demonstrates the separation performances of NCIM-6 under different conditions. The GC-MS analysis of the Klean-Strip® Paint Thinner revels the presence of 0% water in the permeated paint thinner.

TABLE 4a

Flux and rejection performance of a thinner water system at different concentrations for PTFE 0.22-micron NCIM-M at 10 psig transmembrane pressure

| | NCIM-6 | | |
|---|---|---|---|
| Water Concentration in feed (wt %) | Flux (kg/m2 · hr) | Water Concentration in permeate (ppm) | Water Rejection (%) |
| 0 | 1368.48 | N/A | N/A |
| 5 | 1289.1 | 109.48 | 99.73% |
| 10 | 870.49 | 135.14 | 99.83% |
| 20 | 898.1 | 219.99 | 99.86% |

It is clear from Table 4a that NCIM-6 successfully separates the water from the water-thinner dispersion and a rejection of >99.7% was achieved. The thinner flux was quite high at only 10 psig transmembrane feed pressure. The solvent flux although reduced and the water content in the permeate increased slightly with increasing feed water content.

TABLE 4b

Flux and Rejection Performance of a thinner water system at different pressures for 0.22-micron NCIM-M at the same feed water concentration (10 wt % water)

| | NCIM-6 | | |
|---|---|---|---|
| Transmembrane Pressure (psig) | Flux (kg/m2 · hr) | Water Concentration (ppm) | Water Rejection (%) |
| 5 | 415.62 | 399.01 | 99.50% |
| 10 | 870.49 | 135.14 | 99.83% |
| 15 | 1572.91 | 103.1 | 99.87% |
| 20 | 1397.03 | 106.64 | 99.87% |

Table 4b demonstrates the effect of transmembrane pressure at 10 wt % water in feed. The solvent flux increased with an increase in transmembrane pressure as expected. However, the water rejections were maintained constant over 99.5%.

The incorporation of an optimized amount of CNTs on the membrane surface significantly enhanced the water rejection rate for all solvent-water systems including heptane-water, kerosene-water, octane-water, and paint thinner-water systems, while maintaining reasonable solvent flux. The increase in transmembrane pressure increased the organic solvent flux. At a higher transmembrane pressure, the plain membrane and NCIM membrane showed a gradual decrease in water rejection, while the rejection through NCIM optimum remained almost unchanged up to a certain pressure range. Between the two unmodified membranes of PVDF and PTFE, the PVDF membrane exhibited lower water rejection and flux compared to the unmodified PTFE membrane. The high water content in the paint thinner was successfully retained in the feed side and maintained a high water rejection >99.5% under all conditions.

The present disclosure successfully demonstrates a system where the solvent can be freed from its water content (from a trace amount to a large concentration) continuously at very low pressure, eliminating the difficulties in conventional desiccation, absorption or extraction techniques.

The invention claimed is:

1. A nanocarbon immobilized membrane (NCIM) liquid filtration system, comprising:
   a. a membrane module, the membrane module comprising a feed inlet, a feed outlet, and a permeate outlet, the feed inlet receiving a feed mixture; and
   b. a membrane positioned within the membrane module, the membrane defining a membrane surface and pores opening onto the membrane surface,
   wherein pressure of the feed mixture is controlled using a pressure controller valve;

wherein the membrane includes immobilized nanocarbons on the membrane surface and within the pores to define a nanocarbon immobilized membrane;

wherein the nanocarbon immobilized membrane separates liquids included within the feed mixture into a permeate and a rententate by enriching a non-aqueous permeate through the nanocarbon immobilized membrane in a liquid phase;

wherein the system does not include any heating element to heat the feed mixture and wherein the system does not include an air pump to provide a sweep gas as entraining media;

wherein the nanocarbon immobilized membrane effects filtration at room temperature without heating the feed mixture to generate high temperature or a vapor pressure gradient; and wherein the immobilized nanocarbons selectively prevent water from passing through the nanocarbon immobilized membrane.

2. The NCIM liquid filtration system of claim 1, wherein the nanocarbons immobilized on the membrane surface and within the pores are selected from the group consisting of carbon nanotubes, graphene oxide, reduced graphene oxide, functionalized nanocarbons, and hybrid nanocarbon combinations thereof.

3. The NCIM liquid filtration system of claim 1, wherein the nanocarbon immobilized membrane is hydrophobic and functions to reject water.

4. The NCIM liquid filtration system of claim 1, wherein the nanocarbons are functionalized so as to alter at least one of the hydrophobicity and other chemical interaction properties of the membrane, thereby altering membrane selectivity.

5. The NCIM liquid filtration system of claim 1, wherein the membrane surface and the pores are chemically modified.

6. The NCIM liquid filtration system of claim 5, wherein the chemical modification comprises incorporation of perfluorooctyltriethoxysilane.

7. The NCIM liquid filtration system of claim 1, wherein the membrane is fabricated from polyvinylidene difluoride (PVDF), polypropylene or polytetrafluroethylene (PTFE).

8. The NCIM liquid filtration system of claim 1, wherein the nanocarbons have a concentration between 0.1 to 6 weight percentage.

9. The NCIM liquid filtration system of claim 1, wherein the water concentration ranges from a trace amount of water to at least 50% of the feed mixture.

10. The NCIM liquid filtration system of claim 1, wherein the feed mixture comprises water and at least one organic solvent, and wherein the permeate comprises purified organic solvent.

11. The NCIM liquid filtration system of claim 1, wherein the feed mixture is an organic water feed mixture, fuel, aviation fuel or biofuel and wherein the membrane is effective to remove water from the organic water feed mixture.

12. The NCIM liquid filtration system of claim 1, wherein the water forms an immiscible layer or an emulsion.

13. The NCIM liquid filtration system of claim 1, wherein the feed mixture is a solvent-water feed mixture or a fuel-water feed mixture.

14. The NCIM liquid filtration system of claim 1, wherein the membrane surface and the pores are chemically modified, and wherein the chemical modification comprises incorporation of fluorinated alkyl silane.

* * * * *